US005225727A

United States Patent [19]

Melrose et al.

[11] Patent Number: 5,225,727

[45] Date of Patent: Jul. 6, 1993

[54] REVERSE SWITCH ASSEMBLY

[75] Inventors: David R. Melrose, Ringoes, N.J.; Kenneth J. Dubuque, Athens; John A. McCallops, Sayre, both of Pa.

[73] Assignee: Ingersoll-Rand Company, Woodcliff Lake, N.J.

[21] Appl. No.: 763,047

[22] Filed: Sep. 20, 1991

[51] Int. Cl.[5] .......... H02K 7/14

[52] U.S. Cl. .......... 310/50; 310/67 R

[58] Field of Search .......... 200/1 V, 43.17; 310/47, 310/50, 67 R; 388/937

[56] References Cited

U.S. PATENT DOCUMENTS

| | | | |
|---|---|---|---|
| 4,903,318 | 2/1990 | Nagata | 388/840 |
| 4,920,734 | 5/1990 | Wenzel | 56/11.1 |
| 4,978,877 | 12/1990 | Quirijnen | 310/239 |
| 5,095,303 | 3/1992 | Clark et al. | 340/710 |

*Primary Examiner*—Steven L. Stephan
*Assistant Examiner*—Judson H. Jones
*Attorney, Agent, or Firm*—Walter C. Vliet

[57] ABSTRACT

A modular reverse switch assembly having a rotating disc actuation member with a plurality of extending tabs which are spaced apart to project to opposite sides of the tool thereby permitting ease of operation by either hand. The modular design permits a wide degree of selection in assembly location and practice.

9 Claims, 1 Drawing Sheet

REVERSE SWITCH ASSEMBLY

BACKGROUND OF THE INVENTION

This invention relates generally to reversing switches for electric motors and the like and more particularly to a modular reversing switch for brushless D.C. electric hand tools.

Present known art for electric hand tool reversing switches include simple slide switches which may be mounted anywhere on the tool. The disadvantage of the known prior art is that even if the switches are located in relatively convenient locations, they are nearly impossible to operate with one hand, particularly if the operator is wearing gloves. This makes the reversing operation generally a two handed operation and, depending on the selected location of the switch, may be inconvenient for either right-handed or left-handed tool operation.

In addition, the switch mountings do not accommodate well to modern methods of modular assembly and, as such, often require special stake or screw type mountings which are inconvenient to assemble and remove for replacement or repair.

The foregoing illustrates limitations known to exist in the present electric hand tool art. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a reverse switch assembly comprising a housing; a switch plate means mounted for rotation in the housing for operation of a switch; a plurality of spaced apart tab means projecting from the switch plate and through a plurality of spaced apart apertures in the housing for rotating the switch plate to select a forward or reverse position of the switch; and means for mounting the housing in a position on the tool whereby the tab means projecting from the switch plate are accessible from both sides of the power tool.

The foregoing and other aspects will become apparent from the following detailed description of the invention when considered in conjunction with the accompanying drawing figures.

BRIEF DESCRIPTION OF THE DRAWING FIGURES

FIG. 1 is a partially sectioned front elevation of a reverse switch assembly according to the present invention; and FIG. 2 is a cross sectioned side elevation view of the reverse switch assembly taken at section A—A of FIG. 1.

DETAILED DESCRIPTION

Figure 2:
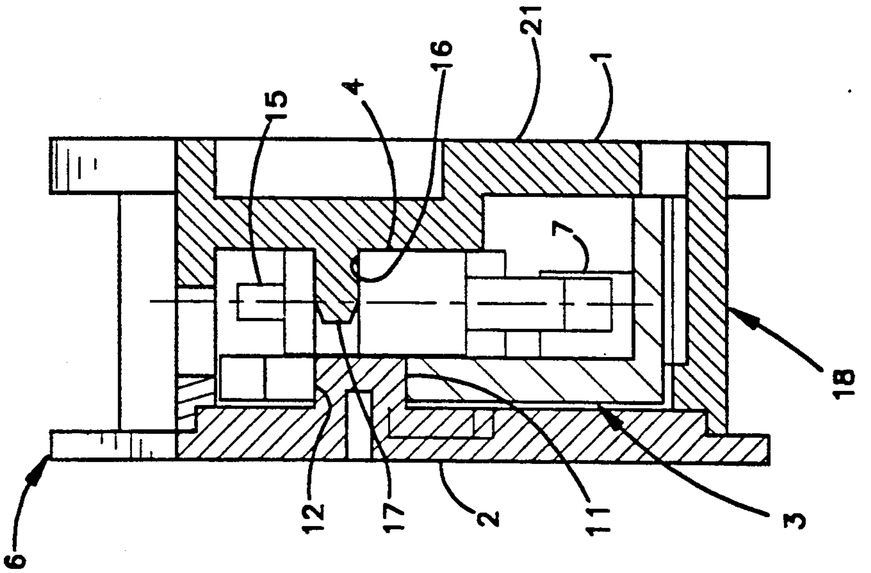
Figure 1:
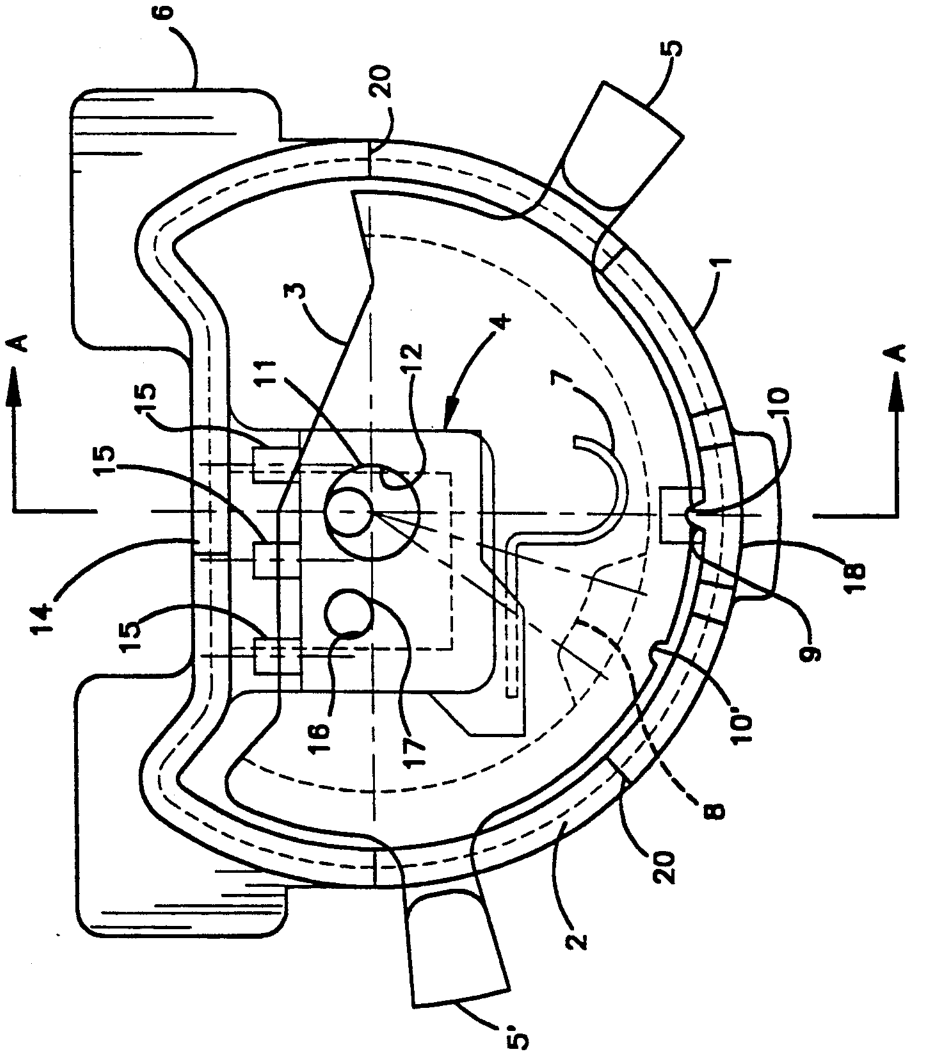

FIG. 1 shows a reverse switch assembly for use with D.C. brushless electric hand tools and the like according to the present invention. As shown in FIG. 1 a hollow cylinder-like housing 1 is shown which contains the assembly. The housing 1 is provided with an end plate closure 2 which cooperates with the housing to form a container for the switch assembly. Mounted for rotation within the housing about a centerline of the housing is a rotary switch plate 3 which is in the form of a semicircular half cup having substantially spaced apart extending tabs 5 and 5' which extend through elongated rectangular apertures 20 formed in the periphery of the housing.

A microswitch 4 is mounted to the nonremovable end 21 of the housing 1 by means of two mounting pins 17 which project into switch mounting holes 16 provided in the microswitch for mounting purposes. The removable end plate or housing closure 2 is provided with a bearing boss 11 which mounts the rotary switch plate 3 for rotation about a bearing hole 12 provided in the rotary plate 3. Bearing boss 11 and a closure spring 22 cooperate to maintain the switch 4 on the mounting pins 17 and the rotary plate 3 in close contact with the microswitch 4.

It should be now appreciated by one skilled in the art that assembly of the switch requires merely that the switch 4 be placed on mounting pin 17 and that the rotary plate 3 be assembled on the bearing boss 11 prior to placing the housing closure 2 on the housing 1. With this assembly the rotary plate 3 may rotate about the bearing boss 11 on bearing hole 12 in rotary relationship to the housing. The rotary plate may further be rotated by means of tabs 5 or 5' which are substantially spaced apart on the rotary plate for operation on either side of the switch. The switch 4 is provided with an accurately bent switch tine 7 which cooperates with a switch cam 8 on the rotary plate 3 to effect switch operation in a forward and reverse mode.

As best seen in FIG. 1, the rotary plate 3 is provided with a pair of detent notches 10 and 10' which for purposes of discussion here may be considered a forward detent notch 10 and a reverse detent notch 10'. However, the functions may be simply reversed by switching the connecting wires on the terminals 15 provided on the switch 4 in conventional manner.

A wire access hole 14 is provided in the housing 1 to facilitate connections of the reverse switch to the appropriate motor circuitry (not shown). Cooperating with the detent notches 10, 10' is a spring loaded detent 9 which is mounted to a slot formed leaf spring 18 formed in the switch housing.

It should be appreciated by one skilled in the art that the detent 9 cooperating with the detent notches 10, 10' retain the selected position of the rotary plate 3 which in turn selects the forward or reverse switching of the microswitch as determined by switch cam 8's position relative to the switch tine 7.

It should be appreciated that rotating the rotary plate 3 counterclockwise to the position, as shown in FIG. 1, will result in the switch cam 8 being placed in a position under the switch tine 7 forcing the switch tine 7 to move upwards and to activate the switch into the reverse position.

A particular feature of the present invention resides in the mounting ears 6 provided on the housing 1. The mounting ears 6 provide both a reversible and readily assembled means of positioning the reversing switch relative to the power tool in assembly practice. The construction of the switch further permits ready manufacture by plastic injection molding techniques. Suitable plastics for such construction are well known in the art.

In operation, the construction of the reverse switch, according to the present invention permits installation, for example above or below a pistol grip type trigger or any other centerline location of the tool which is accessible by the thumb, the forefinger, or any other dextrous digit of either hand thus permitting the ready reversing of the tool without switching of hands. With the projecting nature of the tabs, as shown, the switch may be readily operated even with a gloved hand and the switch tabs protected from accidental operation in use.

Having described the invention, what is claimed is:

1. A reverse switch assembly for a hand held power tool comprising:
   - a housing;
   - a switch plate means mounted for rotation in said housing for operation of a switch;
   - a plurality of spaced apart operating means projecting from said switch plate and through a plurality of spaced apart apertures in said housing for rotating said switch plate to select a forward or reverse position of said switch;
   - means for mounting said housing in a position on said power tool whereby said operating means projecting from said switch pate are accessible from both sides of said power tool and operable by a proximate digit of either tool housing hand; and
   - wherein said switch plate means further comprises a semicircular pate having a lip formed on a portion of its periphery in close proximity to the periphery of said housing.

2. A reverse switch assembly for a power too according to claim 1, wherein said housing further comprises a partially flattened cylinder form having a hollow center and at least one removable end for access.

3. A reverse switch assembly for a power tool according to claim 2, wherein said plurality of spaced apart means projecting from said switch plate are ear like tabs radially projecting from said switch plate and extending through apertures provided in the periphery of said housing.

4. A reverse switch assembly for a power tool according to claim 1, wherein said means for mounting said housing in a position on said tool further comprises a plurality of ear like projections extending from said housing for registry with complimentary recesses in the power tool.

5. A reverse switch assembly for a power tool according to claim 1, wherein said switch is provided with an operating tine which contacts a cam means on said switch plate in one position of said switch plate relative to said housing and is out of registry with said switch plate in a second position.

6. A reverse switch assembly for a power tool according to claim 1, wherein said switch plate means and said housing are positioned in relative rotation by means of a detent formed on a cut leaf spring on said housing.

7. A reverse switch assembly for a power tool according to claim 6, wherein the assembly of said switch plate and said switch are maintained within said housing by a closure means.

8. A reverse switch assembly for a power tool according to claim 6, wherein said closure assembly is provided with bearing means allowing rotation of said switch plate means about a concentric center relative to a peripheral surface of said housing.

9. A reverse switch assembly for operation by a proximate digit of either hand comprising:
   - a hollow cylinder-like housing having a peripheral surface formed to be concentric about an axis of said cylinder-like housing;
   - a semicircular disc like switch operating plate mounted for rotation about said axis having a lip formed on a portion of its periphery in close proximity to the periphery of said cylinder-like housing and having a plurality of operating projections projecting from said switch plate;
   - said peripheral surface being provided with a plurality of apertures through which said operating projections extend for manual operation of said switch plate and rotation about said axis; and
   - switch means in register with said housing and said switch plate in one selected position of said switch plate relative to said housing and out of registry with said switch plate in a second position.

* * * * *